(12) United States Patent
Fiore et al.

(10) Patent No.: US 11,774,035 B2
(45) Date of Patent: Oct. 3, 2023

(54) TRIPOD WITH SYSTEM FOR LOCKING/UNLOCKING THE LEGS

(71) Applicant: CARTONI S.P.A., Rome (IT)

(72) Inventors: Alessandro Fiore, Rome (IT); Filippo Nalli, Rome (IT)

(73) Assignee: CARTONI S.P.A., Rome (IT)

( * ) Notice: Subject to any disclaimer, the term of this patent is extended or adjusted under 35 U.S.C. 154(b) by 0 days.

(21) Appl. No.: 17/811,558

(22) Filed: Jul. 8, 2022

(65) Prior Publication Data
US 2023/0022365 A1   Jan. 26, 2023

(30) Foreign Application Priority Data

Jul. 9, 2021   (IT) .................. 102021000018167

(51) Int. Cl.
*F16M 11/32*   (2006.01)
*F16M 11/34*   (2006.01)
(Continued)

(52) U.S. Cl.
CPC ............. *F16M 11/32* (2013.01); *F16B 7/149* (2013.01); *F16B 7/1427* (2013.01);
(Continued)

(58) Field of Classification Search
CPC ........ F16M 11/16; F16M 11/26; F16M 11/32; F16M 11/34; F16B 7/1454; F16B 7/149; F16B 7/1427; F16B 7/1463
See application file for complete search history.

(56) References Cited

U.S. PATENT DOCUMENTS

| 6,082,685 | A  | * | 7/2000 | Hein ...................... F16M 11/26 248/161 |
| 6,286,795 | B1 | * | 9/2001 | Johnson ................. F16M 11/16 248/188 |

(Continued)

FOREIGN PATENT DOCUMENTS

| EP | 1027554 61 | | 2/2004 | |
| WO | WO-9920933 A1 | * | 4/1999 | ............ F16M 11/16 |
| WO | WO 2011/026444 A1 | | 3/2011 | |

OTHER PUBLICATIONS

Search Report issued in Italian Patent Application No. IT202100018167, dated Apr. 1, 2021, in 10 pages.

*Primary Examiner* — Eret C McNichols
(74) *Attorney, Agent, or Firm* — Knobbe, Martens, Olson & Bear, LLP (57) ABSTRACT

The present disclosure relates to a tripod comprising a connecting element, at least three legs coupled to said connecting element, each leg being divided into at least two sections able to slide with respect to each other. Each leg provides locking and unlocking means of the sliding movement between the sections of the respective leg. Said tripod further provides an actuation element of said locking and unlocking means. Said tripod is characterized in that said actuation element is arranged on said connecting element, and in comprising transmission means arranged on the connecting element connected to said actuation element and to said locking/unlocking means of each leg and in that said tripod is configured so that by acting on said actuation element said transmission means act simultaneously on said locking/unlocking means of each leg preventing/allowing the sliding movement between said sections of each leg.

20 Claims, 11 Drawing Sheets

(51) Int. Cl.
*F16M 11/16* (2006.01)
*F16B 7/14* (2006.01)
*F16M 11/26* (2006.01)

(52) U.S. Cl.
CPC .......... *F16B 7/1454* (2013.01); *F16B 7/1463* (2013.01); *F16M 11/16* (2013.01); *F16M 11/26* (2013.01); *F16M 11/34* (2013.01)

(56) References Cited

U.S. PATENT DOCUMENTS

| | | | |
|---|---|---|---|
| 7,178,767 B2* | 2/2007 | Steyn | F16B 7/14 |
| | | | 248/440 |
| 8,292,240 B2* | 10/2012 | Hein | G03B 17/561 |
| | | | 396/419 |
| 8,528,868 B2* | 9/2013 | Leung | F16M 11/18 |
| | | | 248/157 |
| 11,608,934 B2* | 3/2023 | Speggiorin | F16M 11/36 |
| 2004/0206879 A1 | 10/2004 | Steyn et al. | |
| 2021/0106371 A1 | 1/2021 | He et al. | |
| 2022/0291574 A1* | 9/2022 | Speggiorin | F16M 11/26 |

* cited by examiner

TRIPOD WITH SYSTEM FOR LOCKING/UNLOCKING THE LEGS

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57.

FIELD

The present disclosure relates to a tripod for audiovisual or photographic applications.

More particularly, the present disclosure relates to a tripod equipped with a simultaneous locking and unlocking system for the legs.

BACKGROUND

A tripod used for audiovisual or photographic applications, is suitable for the support of a video camera or a photo camera. These devices require, during the execution of audio-video shootings or photographic services, a support that is able to keep them stable and at the necessary height.

In order to achieve such aim, the tripods are generally equipped with three legs that allow constraining the head for the support of the device for capturing audio-video frames or photographic images to the ground, thus keeping the device stable at the desired height.

Such known tripods are, in particular, equipped with multi-stage legs. In particular, the legs are divided into a plurality of portions or sections, usually two, three or four, movable between them that allow adjusting the height of the tripod. Such legs usually provide telescopic sections, in particular made up of coaxial tubes that slide inside each other. In other known variants, the sections may also not be coaxial.

The extension of a leg usually occurs by unlocking each section and by locking it again once the desired extension has been reached.

In some known tripods, particularly successful in the market, such as the one described in Italian patent no. 102006901465783 in the name of the same Applicant, all the sections of the same leg can be locked or unlocked simultaneously with a single command. This amounts to an undeniable advantage when shorter times are required for positioning the tripod.

SUMMARY

Although such known solution is particularly advantageous for the user, they are still forced to lock/unlock each leg of the tripod separately, thus requiring time to operate on each leg.

Aim of the present disclosure is to further speed up the time for locking/unlocking the sections of the legs of a tripod and thus their positioning.

Another aim of the disclosure is to speed up the leveling of the tripod head.

It is object of the present disclosure a tripod comprising a connecting element, at least three legs coupled to said connecting element, each leg being divided into at least two sections able to slide with respect to each other, each leg providing locking and unlocking means of the sliding movement between the sections of the respective leg, said tripod further providing an actuation element of said locking and unlocking means, said tripod being characterized in that said actuation element is arranged on said connecting element, in comprising transmission means arranged on the connecting element connected to said actuation element and to said locking/unlocking means of each leg and in that said tripod is configured so that by acting on said actuation element said transmission means act simultaneously on said locking/unlocking means of each leg preventing/allowing the sliding movement between said sections of each leg.

In particular, according to the disclosure, said actuation element may be able to exert a torque on said transmission means which in turn are adapted to transmit a rotation movement to said locking/unlocking means of each leg.

Again according to the disclosure, said actuation element may comprise a rotating element able to rotate integrally with a respective shaft, in particular said rotating element may be a ring nut or a knob or a lever.

According to the disclosure, said transmission means may comprise a plurality of wheels adapted at transmitting a rotary motion, in particular friction wheels or toothed wheels.

In particular, according to the disclosure, said transmission means may further comprise a flexible element for transmitting the rotary motion between said wheels, in particular said flexible element may a belt or a chain.

Again according to the disclosure, said locking/unlocking means may comprise a locking element, in particular a wedge-shaped stopper, adapted to exert a friction force on at least one section of a respective leg for blocking the sliding movement between the sections of said leg.

Preferably according to the disclosure, at least in correspondence with the first section of each leg, said locking/unlocking means may provide a connecting rod adapted to act on said locking element.

In addition, according to the disclosure, each connecting rod may be able to rotate along its own axis for acting on said locking element when the transmission means transmit the rotary motion exerted by the actuation element.

Again according to the disclosure, the first connecting rod arranged in correspondence with the first section of each leg, may have at a first end or upper end a transmission element connected to said transmission means adapted to transmit the rotary motion from said transmission means to said first connecting rod even when they are arranged on non-coinciding rotation axes, preferably said transmission element may be an universal joint or a flexible element.

According to the disclosure, said locking/unlocking means, at a second end or lower end, opposite the first end, of said connecting rod may have a screw mechanism able to act, when rotated, on said locking element in order to move it away from or move it closer to at least one section for locking or unlocking its sliding movement with respect to the other sections.

In particular, according to the disclosure, each leg may provide at least a first junction element between two sections, in that each junction element may provide a housing for the respective wedge-shaped stopper having a tilted wall.

More in particular, according to the disclosure, said screw mechanism may comprise a sliding threaded insert, on said locking element it may be provided a seat wherein said thread insert may be adapted to slide for displacing said locking element so as to pass to a locking or unlocking position of the sliding movement between the sections of the respective leg.

Further according to the disclosure, each leg may be divided into at least three sections, in that at least in correspondence with the first and second section it may be provided a respective connecting rod, in that the second connecting rod may have a prismatic cross-section, said prismatic cross-section having a size in order to be telescopic with respect to the first connecting rod, in that the screw mechanism arranged at the lower end of the first connecting rod may have a hollow seat with a prismatic cross-section having a larger size than the outer body of the second rod, so that said second rod can slide but not rotate.

Again according to the disclosure, said transmission means may provide a first wheel integral with a first shaft of said actuation element and at least one second wheel on said connecting element at each leg.

According to the disclosure, said transmission means may comprise a plurality of further second wheels adapted to transmit the rotary motion and arranged both between said first wheel and said second wheels arranged on the connecting element at the respective leg both between the same second wheels arranged on the connecting element at the respective legs.

In addition, according to the disclosure, said further wheels may be idler wheels adapted to guarantee the correct tensioning of said flexible element, preferably said idler wheels may have a different diameter, in particular smaller, than the diameter of the first and second wheels.

Finally according to the disclosure, each second wheel may be integral to a respective second shaft and the first end or top end of each first connecting rod, arranged at the first section of the respective leg, may be integrally connected to the respective second shaft.

BRIEF DESCRIPTION OF THE DRAWINGS

The disclosure will now be described by way of illustration but not limitation, with particular reference to the drawings of the accompanying figures, wherein:

FIG. 4b shows detail IVb of the tripod of FIG. 4a;

FIG. 6b shows a side sectional view along the section plane VIb-VIb' of a leg of the tripod of FIG. 6a;

FIG. 13a shows a front view of the tripod of FIG. 10a;

FIG. 13b shows a side sectional view along the section plane XIIIb-XIIIb' of a leg of the tripod of FIG. 13a;

DETAILED DESCRIPTION

Making reference to FIGS. 1-7, a first embodiment of a tripod according to the disclosure indicated by numerical reference 1 is observed.

Figure 1A:
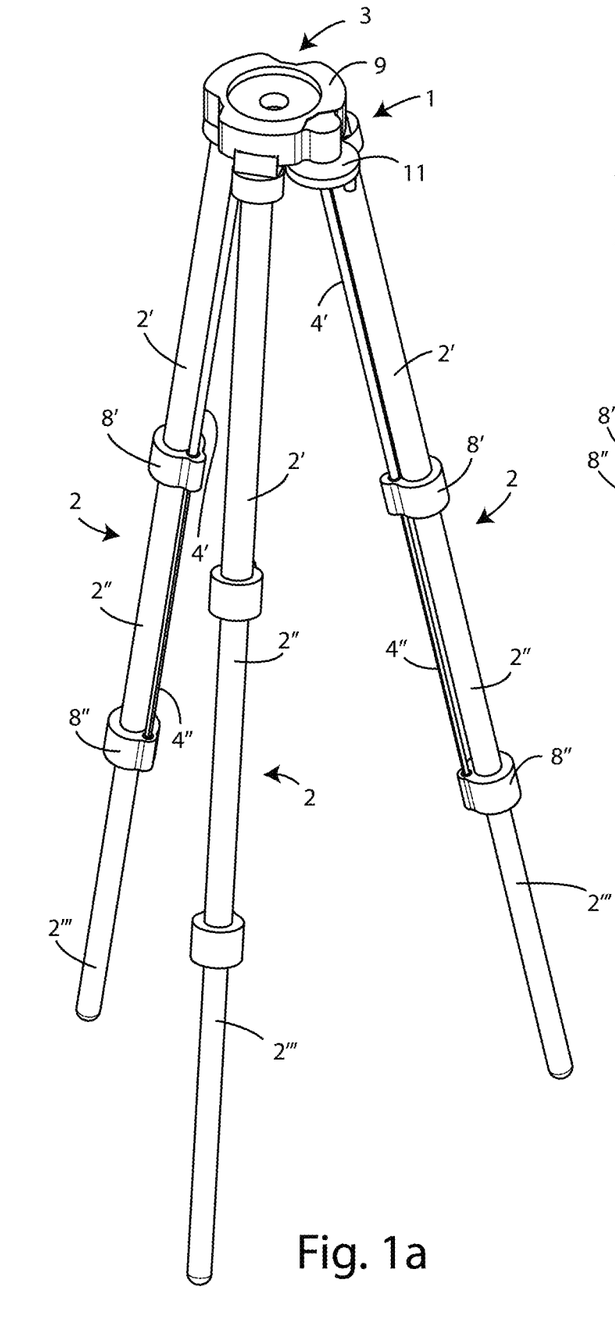
FIGS. 1a and 1b show a perspective view of a tripod according to the disclosure in a first embodiment respectively in an open or extended position and in a closed or retracted position.
Figure 1B:
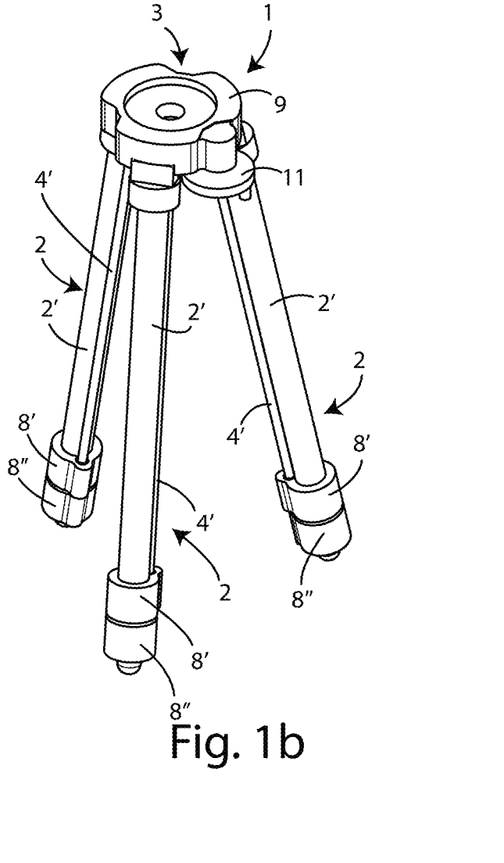

Said tripod 1 has three legs 2 connected at their upper ends to a connecting element 3 arranged at the sub-cup. At the connection element 3, the head for the support of the audio-video or photographic device (not shown) is mounted.

Each leg 2 comprises three portions or sections 2', 2" and 2'", in particular concentric and telescopic. The first section 2', is fixed above the connecting element 3, the second section 2" is slidably coupled to the first section 2' and the third section 2'" is slidably coupled to the second section 2". In other embodiments, two or more than three sections may be provided.

Said legs 2 are configured in such a way as to assume a first retracted configuration, wherein the sections 2', 2" and 2'" of the legs 2 are grouped (shown in FIG. 1b) and a second extended configuration, wherein the sections 2', 2" and 2" of the legs 2 are completely extended, obtaining a maximum height of the tripod 1. The three sections 2', 2" and 2" of the tripod 1 allow to fully open the legs of the tripod in two stages of maximum extension.

All intermediate configurations between the two configurations described are equally possible, by acting on appropriate actuation means as it will be described in the following.

The three legs 2 of the tripod 1 are structurally the same and therefore only one of them will be described below, the same features also being valid for the others.

In the particular embodiment each section 2', 2", 2'" of each leg 2 is a hollow tubular element. Such legs 2 are preferably made of metal alloys, generally aluminum, or alternatively polymers or carbon fiber.

In particular, the first section 2', coupled to the connecting member 3, has a hollow body having a greater diameter than the outer body of the second section 2", so that the latter is able to slide in said hollow body of the first section 2'. In turn, the second section 2" has a hollow body having a greater diameter than the outer body of the third section 2'", so that the latter is able to slide into said hollow body of the second section 2".

Said tripod 1 further comprises a control element or actuation element 11 associated with motion transmission means 10 adapted to act on each leg 2 of the tripod 1 to simultaneously lock or unlock the sliding movement of the sections 2', 2", 2'" of each leg 2 to allow partial or total extension or partial or total retraction, and thus pass from the first to the second configuration and vice versa.

Figure 2:
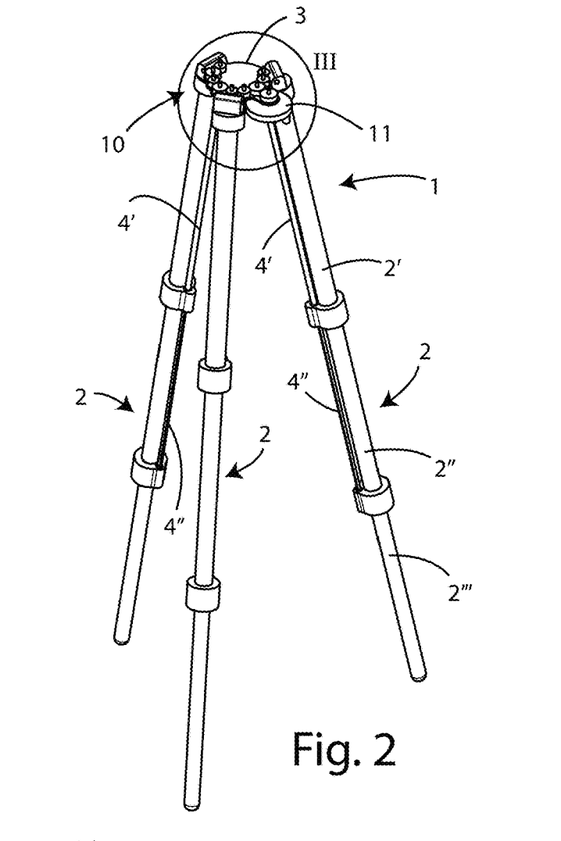
FIG. 2 shows a perspective view of the tripod of FIG. 1 devoid of an upper cover element.

The motion transmission means 10 of the tripod 1 according to the first embodiment are in particular visible in FIG. 2, as they are preferably arranged under a covering element 9 at said connecting element 3. Said covering element 9 may be the sub-cup of the tripod 1.

Figure 3:
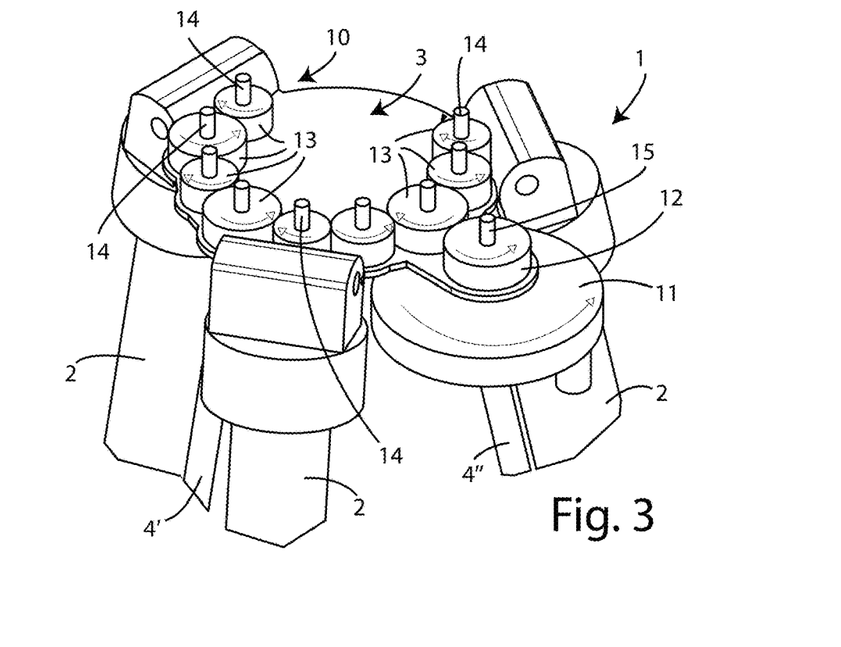
FIG. 3 shows detail III of the tripod of FIG. 2.
Figure 4A:
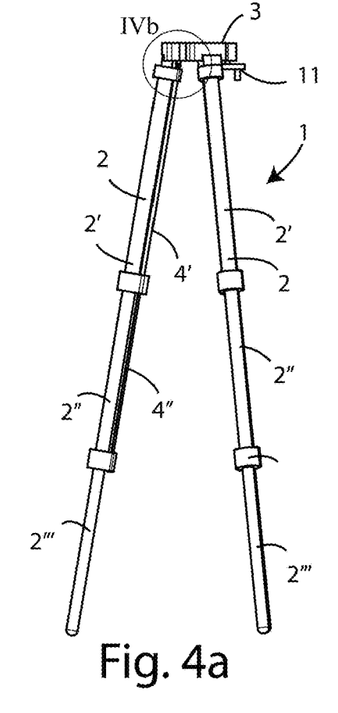
FIG. 4a shows a side view of the tripod of FIG. 1.
Figure 4B:
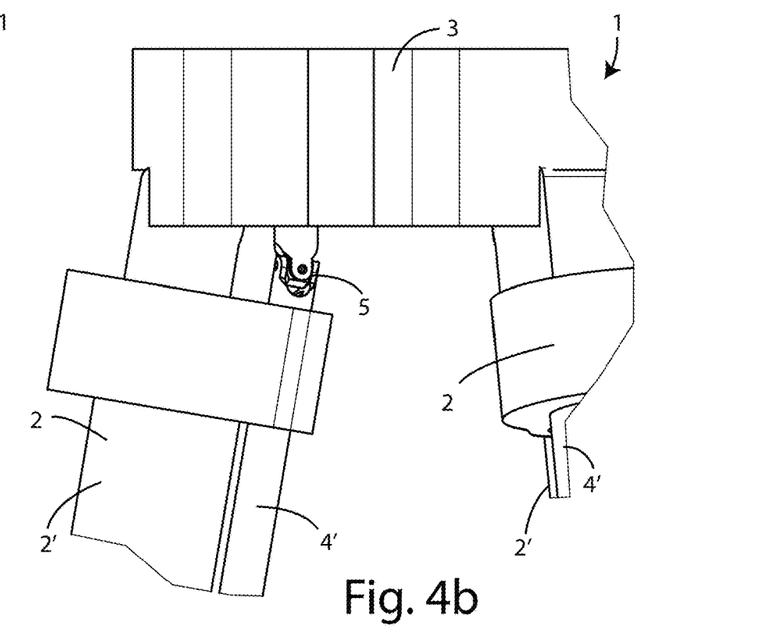

In the specific embodiment the actuation element is a knob 11 adapted to be rotated integrally with a drive shaft 15 that transmits the rotary motion to a plurality of first 12 and second 13 wheels, in particular friction wheels.

In other embodiments, another rotary element may be provided for transmitting the rotary motion of the knob 11.

In addition, the actuation element may be different from the knob 11 shown, as long as it is capable of imprinting a torque on a rotation axis.

Figure 6A:
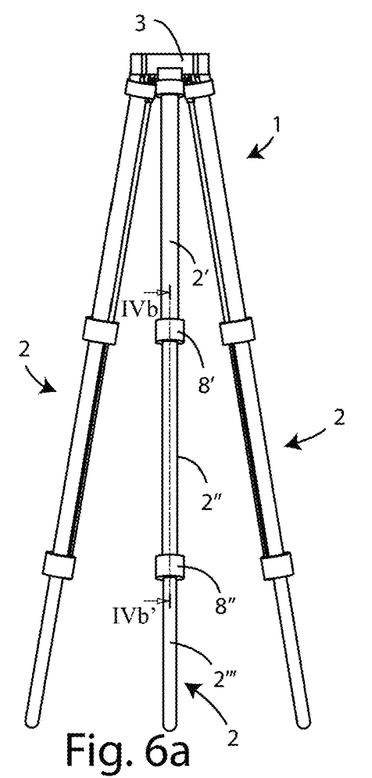
FIG. 6a shows a front view of the tripod of FIG. 1.
Figure 6B:
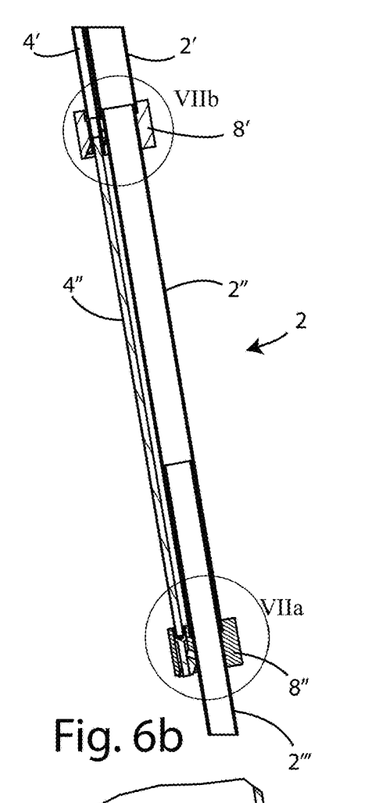

The first section 2' of each leg 2 comprises a first rod or connecting rod 4' arranged parallel to the first section 2', eventually it may be arranged coaxially to said first section 2'. The first rod 4' is coupled above the connecting member 3 and below a first junction element 8' integral with the lower end of the first section 2'.

The upper end of said first rod 4' is connected to said rotary motion transmission means 10. In the particular embodiment the first end or upper end of the first rod 4' is integrally connected to the second shaft 14 of a second wheel 13 of the motion transmission mechanism 10. The lower end or second end of the first rod 4' is integrally coupled to the first junction element 8'.

Said first rod 4' is adapted to rotate on its rotation axis.

During use, when the user, in particular an operator, acts on the knob 11 imparting a torque along the axis of rotation of the first shaft 15, this rotary movement is transmitted through a first wheel 12 integral with the first shaft 15 to a plurality of second wheels 13 which in turn transmit the rotary movement to the first rod 4' of the first section 2' of each leg 2 simultaneously. In the particular embodiment, the user acts on the knob 11 that rotates with respect to its axis of rotation, transferring the rotary motion to a first wheel 12, through the same shaft 15 on which they are coupled together, which transmits the rotary motion to a plurality of second wheels 13 that will rotate on their shafts 14. The second wheels 13 arranged at the respective first sections 2' simultaneously transmit the rotary motion to the respective first rod 4'.

In turn, each first rod 4' transmits the locking or unlocking command to the remaining sections 2", 2'" of the leg 2.

Figure 5:
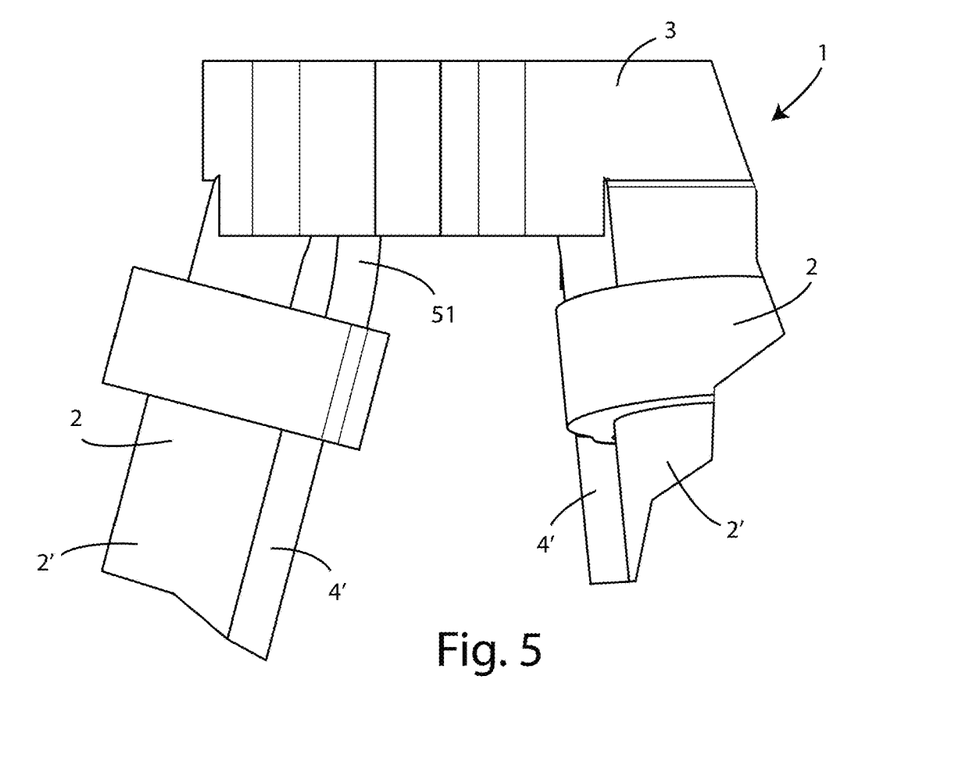
FIG. 5 shows a variant of the transmission element of FIG. 4b.

In particular, each first rod 4' or connecting rod 4' is connected to the connecting member 3 by means of a transmission element 5 (shown in particular in FIG. 4b) which guarantees the transmission of the rotary motion between the wheels 13 and the first rod 4' allowing the deviation from the vertical axis of each leg 2 of a desired angle independently of the others. In other words, the transmission element 5 is able to transmit the rotary motion regardless of the different inclination of the relative leg 2 with respect to the axis of rotation of the shaft 14 of the respective second wheel 13 arranged at said leg 2. The transmission element 5 is in fact adapted to transmit the rotary motion even when the axes of rotation of the shaft 14 and the rod 4' are not aligned, for example they are inclined to each other. In the embodiment shown in FIGS. 4a and 4b the transmission element is a cardan joint or universal joint 5. Alternatively, as shown in FIG. 5 the transmission element is a flexible element 51, in particular elastic.

The second section 2" is also equipped with a second rod 4" coaxial to said first rod 4' and telescopic with respect to it. In particular, the first rod 4' has a hollow body having a greater diameter than the outer body of the second rod 4", so that the second rod 4" can slide internally to said first rod 4'.

The lower end of the first rod 4' is integrally coupled to the first junction 8'. The first junction 8' is provided with a screw mechanism 6 (shown in FIG. 7b) that acts on a wedge-shaped stopper 7 that acts by friction on the second section 2" of the leg 2 locking the linear sliding of the second section 2" with respect to the first section 2'.

Figure 7A:
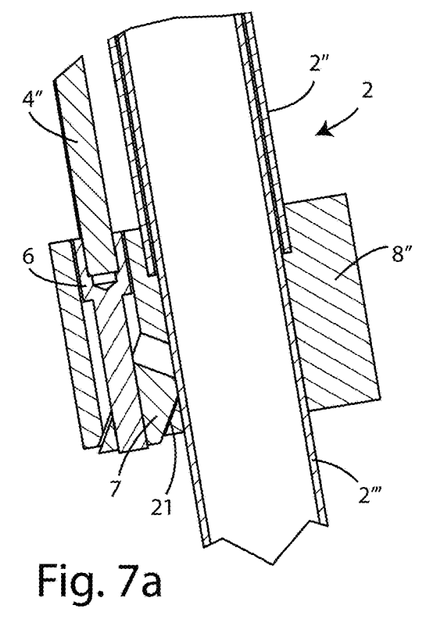
FIG. 7a shows detail VIIa of the leg of the tripod of FIG. 6b.
Figure 7B:
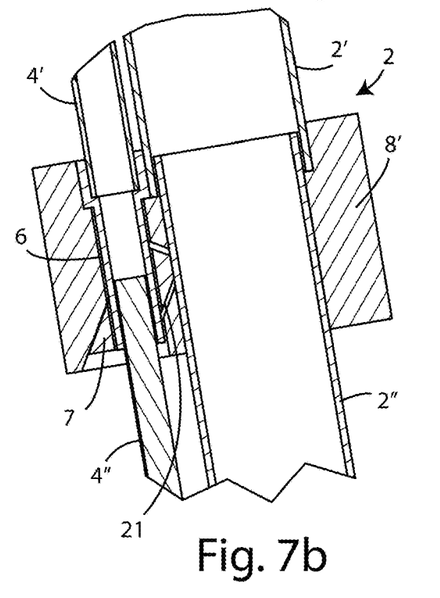
FIG. 7b shows detail VIIb of the leg of the tripod of FIG. 6b.

More specifically, the first junction 8' provides a housing for the wedge-shaped stopper 7 provided with an inclined or tilted wall 21. When the screw mechanism 6 rotates due to the rotation of the connecting rod 4', it causes the sliding of the wedge-shaped stopper 7 on the inclined wall 21, bringing it closer or away from the second section 2" and then preventing it or allowing it to slide.

In addition, the screw mechanism 6 arranged in said first junction 8' has a hollow seat with a square cross-section having a greater size than the outer body of the second rod 4", also having a quadrangular cross-section, so that said second rod 4" can slide but not rotate there, thus creating a prismatic guide that allows the transmission of the rotary motion while maintaining the telescopicity between the two rods 4' and 4".

The lower end of the second rod 4" is coupled to a second connecting member 8'", integral with the second section 2".

The first rod 4', thanks to the first junction 8', transmits the rotary movement to the second rod 4". Similar to the second section 2", also in order to lock the third section 2'" its is provided at the second junction 8" a wedge-shaped locking stopper 7. The second rod 4" at its second end or lower end is connected to a screw mechanism 6 that acts on a wedge-shaped pad 7 that acts by friction on the third section 2'" of the leg 2 locking the linear sliding of the third section 2'" with respect to the second section 2".

The two connecting rods 4', 4" running along the two sections 2', 2" of a leg 2 also create a telescopic system for adapting to the different extensions of the stages of the leg 2 of the tripod 1.

Therefore, all the sections 2', 2", 2'" of all the legs 2 that make up the tripod 1 can be locked or unlocked simultaneously, by acting on a single command 11.

In other embodiments the actuation element may be a knob or lever adapted to apply a torque to an axis. The constructive possibilities and operating principles are numerous and not limited to those illustrated here by way of example.

Figures 19, 20:
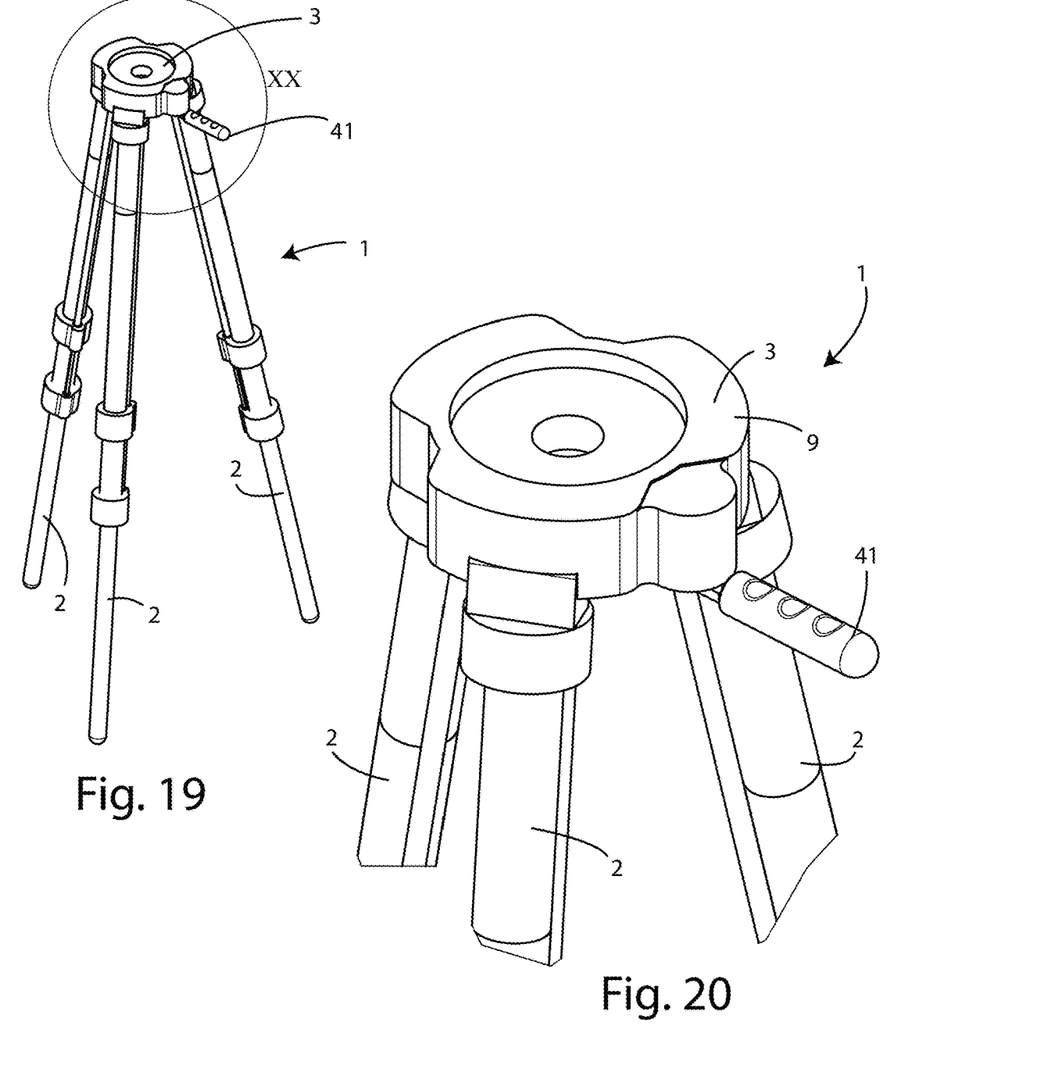
FIG. 19 shows a perspective view of the tripod according to the disclosure in a fourth embodiment.
FIG. 20 shows detail XX of FIG. 19.
Figure 21:
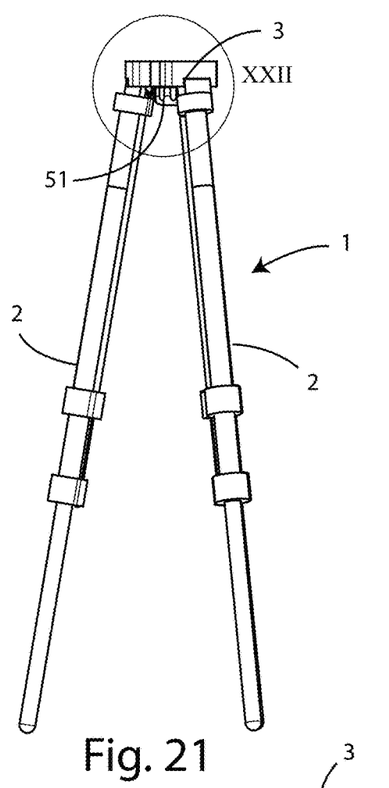
FIG. 21 shows a perspective view of the tripod according to the disclosure in a fifth embodiment.
Figure 22:
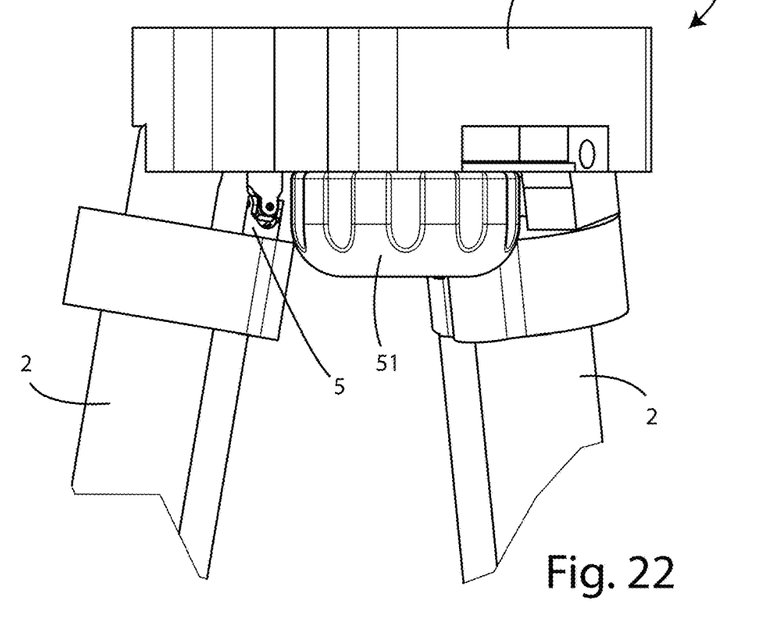
FIG. 22 shows detail XXII of FIG. 21.

For example, in the embodiment shown in FIGS. 19 and 20 the actuation member is a lever 41, while in the embodiment of FIGS. 21 and 22 the actuation element is a ring nut 61.

Figure 8:
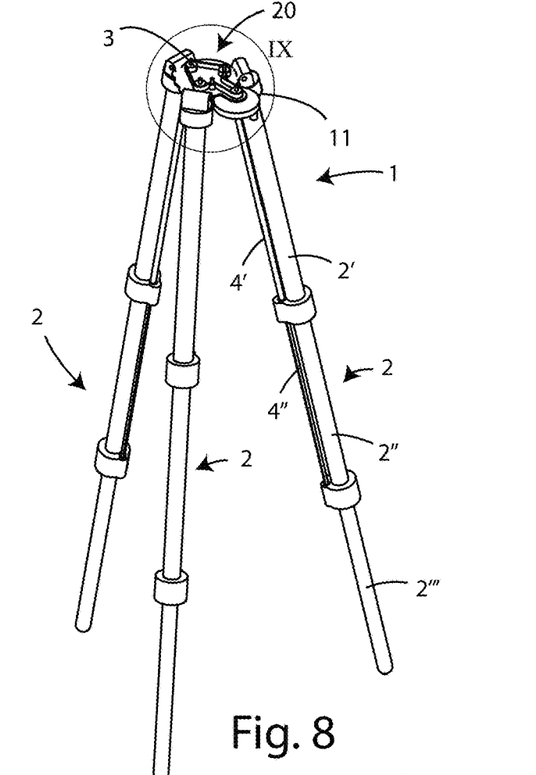
FIG. 8 shows a perspective view of a tripod according to the disclosure in a second embodiment.
Figure 9:
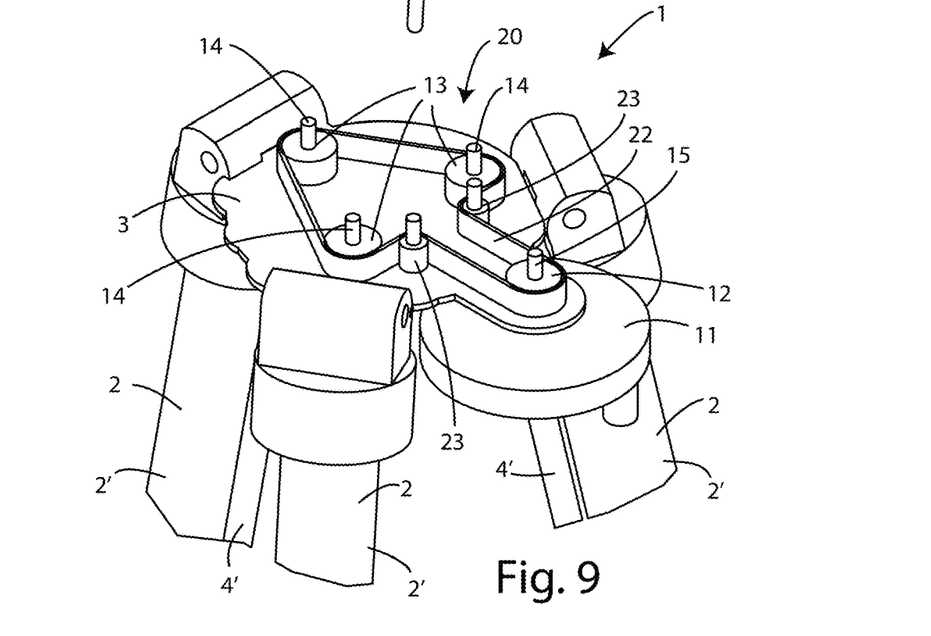
FIG. 9 shows a perspective view of detail IX of the tripod of FIG. 8.

Referring to FIGS. 8 and 9, a second embodiment of the tripod 1 according to the disclosure is shown. It is similar to the first embodiment described, however it employs different means of transmitting the rotary motion 20. Said rotary motion transmission means 20 use a plurality of wheels 12, 13 connected by a flexible element 22, in particular a belt 22.

In this embodiment, therefore, the number of wheels is advantageously reduced, providing a first wheel 12 at the first shaft 15 of the knob 11 and a second wheel 13 at each leg 2 of the tripod 1, connected by the flexible element 22.

In the particular embodiment, additional return wheels 23 have been used to ensure the correct tensioning of the flexible element 22. Such return wheels 23 may have a diameter different from the diameter of the first 12 and second 13 wheels, in particular they have a smaller diameter. Furthermore, these return wheels 23 are arranged on the connecting element 3 according to the reciprocal arrangement of the knob 11 and the legs 2.

A third embodiment of the tripod 1 according to the disclosure is shown in FIGS. 10-18.

Figure 10A:
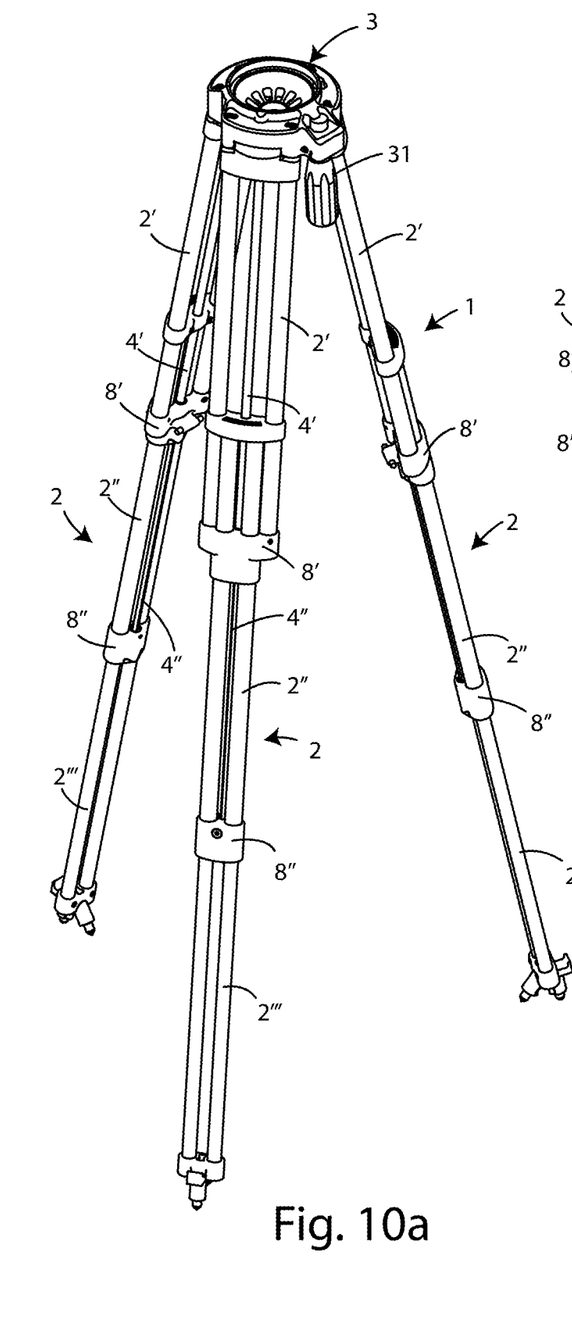
FIGS. 10a and 10b show a perspective view of a tripod according to the disclosure in a third embodiment respectively in an open or extended position and in a closed or retracted position.
Figure 10B:
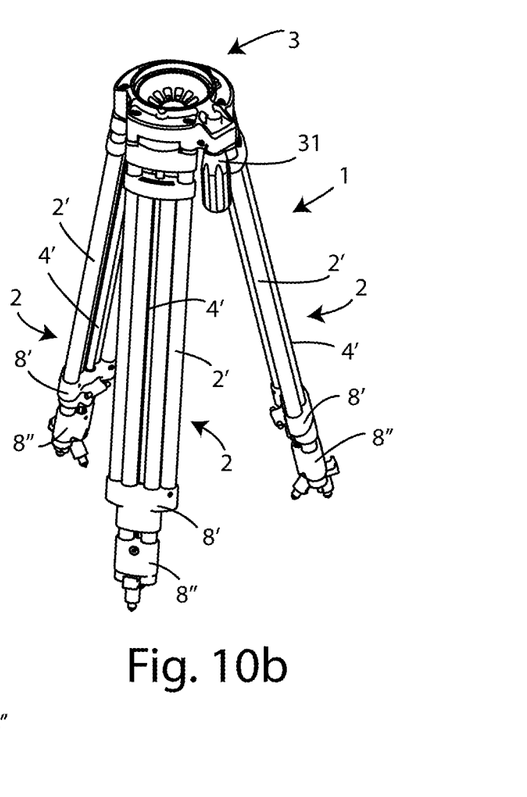

As can be seen, the tripod 1 comprises three legs 2 with multiple bars. In particular, each leg 2 is divided into three sections 2', 2", 2'". Wherein the first section 2' has two parallel bars coupled to the connecting member 3 and to a first junction member 8'. The second section 2" comprises two bars sliding with respect to their respective seats obtained in the first junction 8'. In addition, said second section 2" is integral below to a second junction element 8". The third section 2'" comprises two bars able to slide in the two bars of the second section 2" with respect to said second junction element 8'.

Figure 13A:
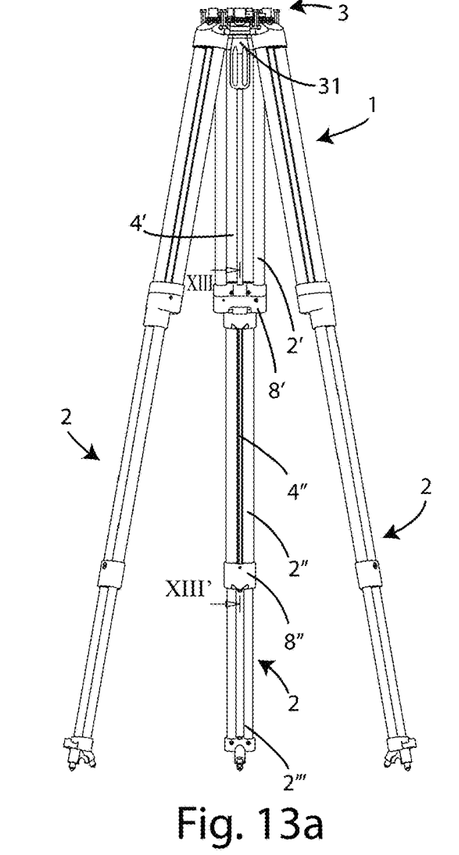
Figure 13B:
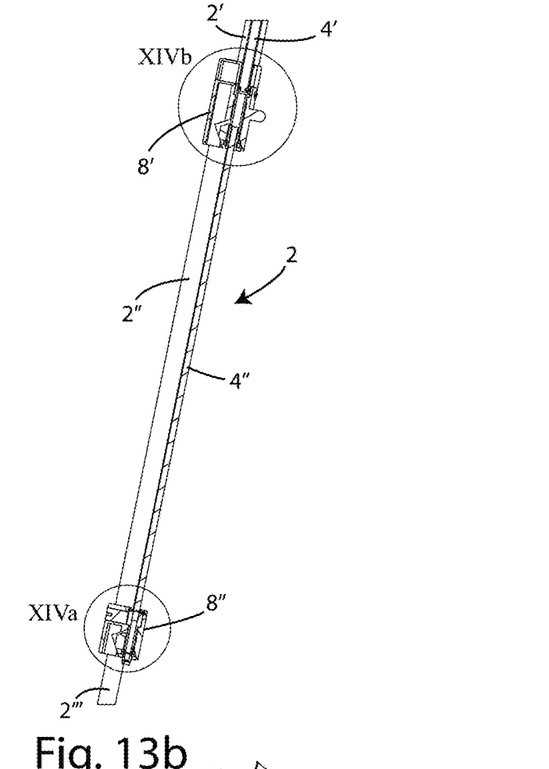

Also in this case there are two connecting rods 4' and 4", each integral to the first two sections 2' and 2".

Figure 11:
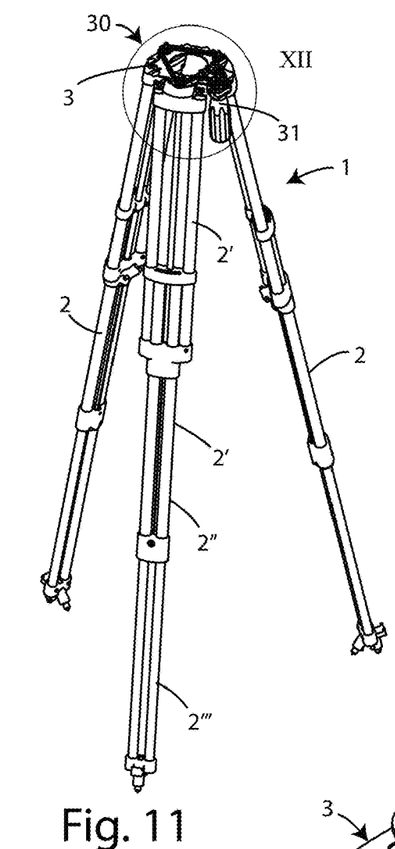
FIG. 11 shows a perspective view of the tripod of FIG. 10a devoid of an upper cover element.
Figure 12:
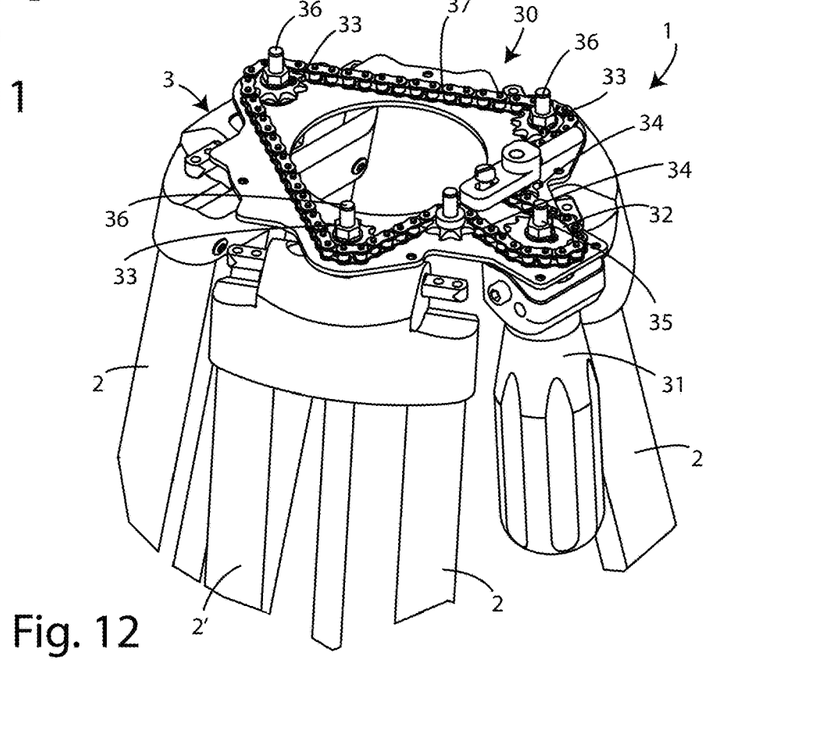
FIG. 12 shows detail XII of the tripod of FIG. 11.

The rotary motion transmission means 30 are similar to those described for the second embodiment of the tripod of FIG. 11, and instead of providing a belt, they provide a chain 37 that engages a plurality of toothed wheels 33.

In the particular embodiment, the drive means are a knob 31 adapted to rotate with respect to an axis of rotation integral with a first shaft 35 in turn integral with a first toothed wheel 32 which is adapted to transmit the rotary motion through the chain 37 to a plurality of second 33 and third 34 toothed wheels, integral with a respective second shaft 36.

The knob 31 has a substantially cylindrical body and it can be suitably used as a handle for transporting the tripod 1.

Similar to the embodiments described above, also for this embodiment the sliding of the second and third sections 2", 2'" is locked by a wedge-shaped stopper system 7 operated by a screw mechanism 6.

Figure 14A:
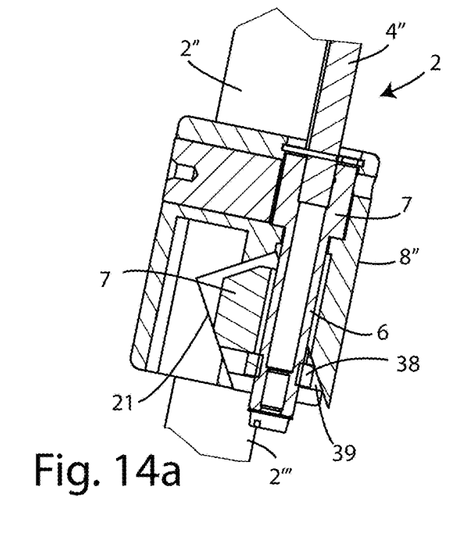
FIG. 14a shows detail XIVa of the leg of the tripod of FIG. 13b.
Figure 14B:
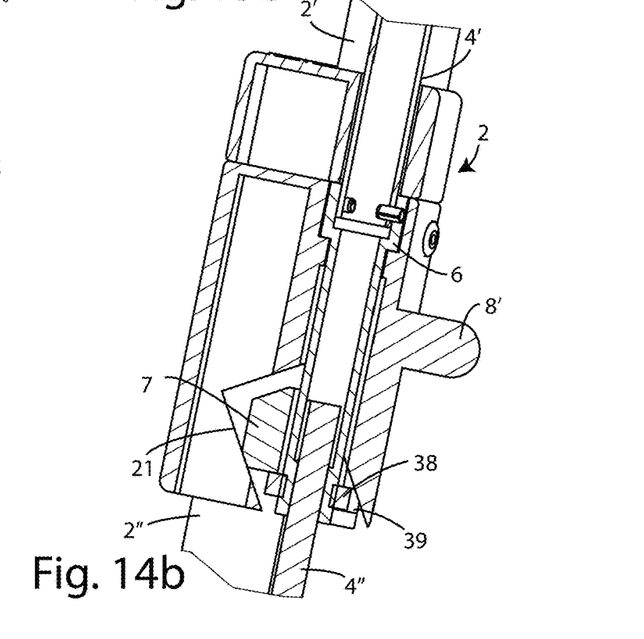
FIG. 14b shows detail XIVb of the leg of the tripod of FIG. 13b.

In this case, as shown in FIGS. 14a-14b, the screw mechanism 6, comprises a sliding threaded insert 38, capable of operating the locking pad or stopper 7 of a telescopic stage on the leg.

A slot or seat 39 is provided on the stopper 7 wherein the threaded insert 38 is free to slide gripped with the screw 6 that drags the locking stopper 7 itself along the inclined wall 21. FIGS. 15a, 16a, 17a and 18a show the locking position of the second 2" and third 2'" section of the tripod 1 at the first 8' and the second 8" junction, wherein the position of the locking stopper 7 acting by friction on the relative section 2" or 2'" is observed, preventing its sliding.

FIGS. 15b, 16b, 17b and 18b show the unlocking position of the second 2" and third 2'" section of the tripod 1 at the first 8' and the second 8" junction, wherein the position of the locking stopper 7 not anymore acting by friction on the relative section 2" or 2'" is observed, which is free of sliding.

Figure 15A:
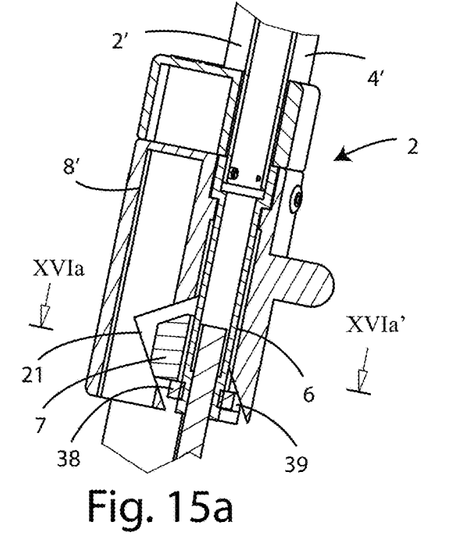
FIGS. 15a and 15b show the locking/unlocking means of FIG. 14b respectively in the locking and unlocking position.
Figure 15B:
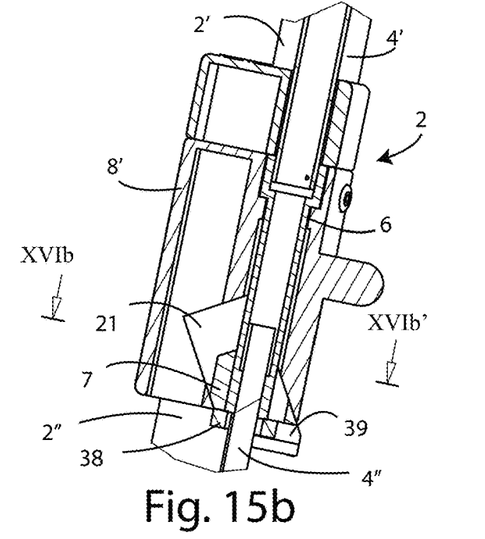
Figure 16A:
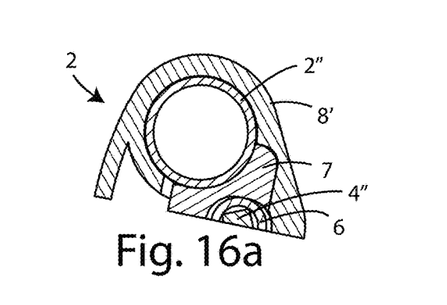
FIGS. 16a and 16b respectively show sectional views along the planes XVIa and XVIb of the details of FIGS. 15a and 15b.
Figure 16B:
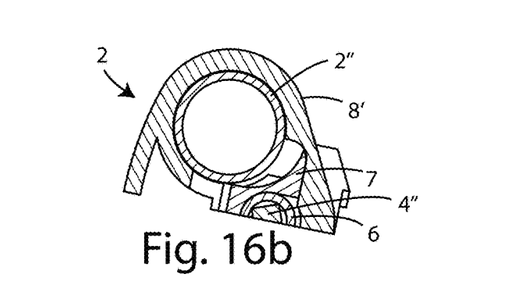
Figure 17A:
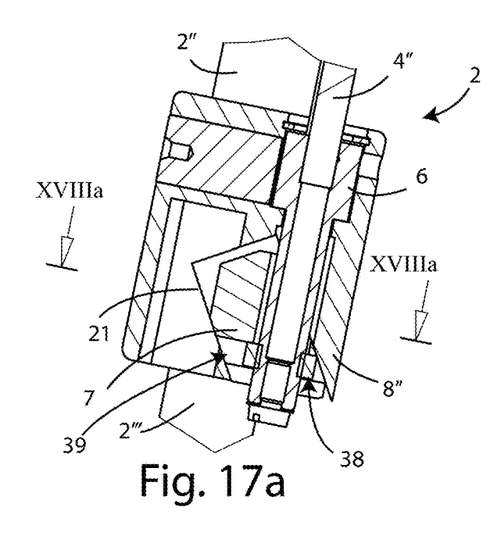
FIGS. 17a and 17b respectively show the locking/unlocking means of FIG. 14a respectively in the locking and unlocking position.
Figure 17B:
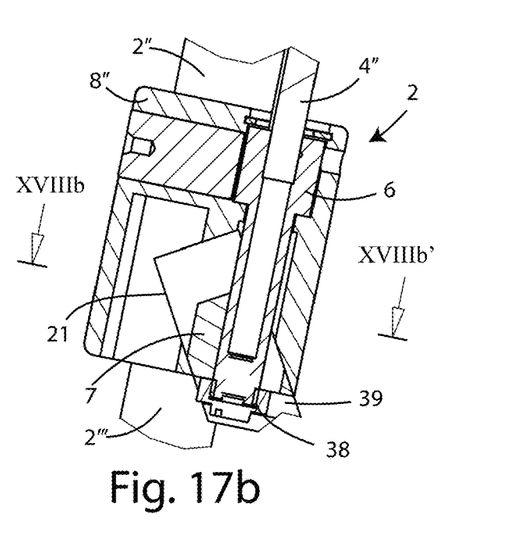
Figure 18A:
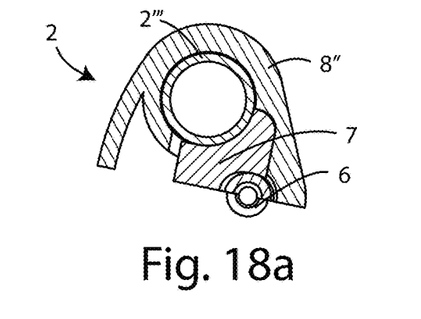
FIGS. 18a and 18b respectively show sectional views along planes XVIIIa and XVIIIb of the details of FIGS. 17a and 17b.
Figure 18B:
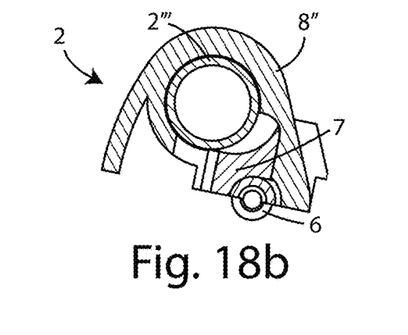

In this way, the axial and orthogonal components of the relative motion of the stopper 7 with respect to the screw 6 have been decoupled, ensuring that the coupling between the threaded screw 6 and the insert 38 can always work correctly and without excessive effort, since the insert 38 moves only axially along the screw 6. The other component of the motion, orthogonal to the screw 6, and necessary to force the wedge 7 against the tubes of the section 2", 2'" to be braked, is made by the motion of the insert 38 in the slot 39 obtained in the stopper 7. This allows a better locking with less actuation effort for the user.

Advantageously, the tripod according to the disclosure allows to speed up the time for locking/unlocking the sections of the legs of the tripod.

Furthermore, it is advantageous to adjust the horizontality of the connecting element 3, since the length of the three legs 2 can be varied simultaneously by acting on a single locking/unlocking command.

The disclosure also allows a homogeneous and simultaneous positioning of each of the three legs with a single opening/closing maneuver exploiting the gravity for the fall of the sections that stops when reaching the ground.

Another object of the disclosure is to speed up the levelling of the head by acting only on the control that simultaneously unlocks all the legs thus allowing its adjustment.

The elements described for the different embodiments are illustrative only and not limiting to the specific embodiment. For example, the disclosed transmission means may be employed for all the disclosed tripods, as well as the actuating elements.

In the above the preferred embodiments have been described and the possible variants of the present disclosure have been outlined, but it is to be understood that the persons skilled in the art may make modifications and changes without falling outside the relative scope of protection, as defined in the attached claims.

What is claimed is:

1. A tripod comprising:
   a connecting element,
   at least three legs coupled to said connecting element, each leg being divided into at least two sections configured to slide with respect to each other,
   wherein each leg comprises locking and unlocking means of the sliding movement between the sections of the respective leg, and
   an actuation element of said locking and unlocking means,
   wherein said actuation element is arranged on said connecting element, in comprising transmission means arranged on the connecting element connected to said actuation element and to said locking and unlocking means of each leg and in that said tripod is configured so that by acting on said actuation element said transmission means act simultaneously on said locking and unlocking means of each leg preventing or allowing the sliding movement between said sections of each leg.

2. The tripod according to claim 1, wherein said actuation element is configured to exert a torque on said transmission means which in turn are configured to transmit a rotation movement to said locking and unlocking means of each leg.

3. The tripod according to claim 1, wherein said actuation element comprises a rotating element configured to rotate integrally with a respective shaft.

4. The tripod according to claim 2, wherein said transmission means comprise a plurality of wheels configured at transmitting a rotary motion.

5. The tripod according to claim 4, wherein said transmission means further comprise a flexible element for transmitting the rotary motion between said plurality of wheels.

6. The tripod according to claim 1, wherein said locking and unlocking means comprise a locking element comprising a wedge-shaped stopper, the locking element configured to exert a friction force on at least one section of a respective leg for blocking the sliding movement between the sections of said leg.

7. The tripod according to claim 6, wherein, at least in correspondence with a first section of each leg, said locking and unlocking means provide a connecting rod configured to act on said locking element.

8. The tripod according to claim 7, wherein said transmission means comprise a plurality of wheels configured at transmitting a rotary motion, wherein each connecting rod is configured to rotate along its own axis for acting on said locking element when the transmission means transmit the rotary motion exerted by the actuation element.

9. The tripod according to claim 8, wherein a first connecting rod arranged in correspondence with the first section of each leg has at a first end or upper end a transmission element connected to said transmission means configured to transmit the rotary motion from said transmission means to said first connecting rod even when they are arranged on non-coinciding rotation axes, wherein said transmission element is an universal joint or a flexible element.

10. The tripod according to claim 9, wherein said locking and unlocking means, at a second end or lower end, opposite the first end, of said connecting rod have a screw mechanism configured to act, when rotated, on said locking element in order to move it away from or move it closer to at least one section for locking or unlocking its sliding movement with respect to the other sections.

11. The tripod according to claim 6, wherein each leg provides at least a first junction element between two sections, in that each junction element provides a housing for the respective wedge-shaped stopper having a tilted wall.

12. The tripod according to claim 10, wherein said screw mechanism comprises a sliding threaded insert, in that on said locking element it is provided a seat wherein said sliding threaded insert is configured to slide for displacing said locking element so as to pass to a locking or unlocking position of the sliding movement between the sections of the respective leg.

13. The tripod according to claim 10, wherein each leg is divided into at least three sections, in that at least in correspondence with the first section and a second section it is provided a respective connecting rod, in that a second connecting rod has a prismatic cross-section, said prismatic cross-section having a size in order to be telescopic with respect to a first connecting rod, in that the screw mechanism arranged at the lower end of the first connecting rod has a hollow seat with a prismatic cross-section having a larger size than an outer body of the second connecting rod, so that said second connecting rod can slide but not rotate.

14. The tripod according to claim 4, wherein said transmission means provide a first wheel integral with a first shaft of said actuation element and at least one second wheel on said connecting element at each leg.

15. The tripod according to claim 14, wherein said transmission means comprise a plurality of further second wheels configured to transmit the rotary motion and arranged both between said first wheel and said at least one second wheel arranged on the connecting element at the respective leg both between the at least one second wheel arranged on the connecting element at the respective leg.

16. The tripod according to claim 15, wherein said transmission means further comprise a flexible element for transmitting the rotary motion between said first and at least one second wheels, and wherein said plurality of further second wheels are idler wheels configured provide a desired tensioning of said flexible element, preferably said idler wheels have a different diameter, in particular smaller, than the diameter of the first and second wheels.

17. The tripod according to claim 12, wherein said locking and unlocking means comprise a locking element comprising a wedge-shaped stopper, the locking element configured to exert a friction force on at least one section of a respective leg for blocking the sliding movement between the sections of said leg, wherein, at least in correspondence with the first section of each leg, said locking and unlocking means provide the connecting rod configured to act on said locking element, wherein said transmission means comprise a plurality of second wheels configured to transmit the rotary motion, and wherein each of the plurality of second wheels is integral to a respective second shaft and in that the first end or top end of each first connecting rod, arranged at the first section of the respective leg, is integrally connected to the respective second shaft.

18. The tripod according to claim 3, wherein said rotating element is a ring nut, a knob, or a lever.

19. The tripod according to claim 4, wherein said plurality of wheels comprises friction wheels or toothed wheels.

20. The tripod according to claim 5, wherein said flexible element is a belt or a chain.

* * * * *